US009018337B2

(12) United States Patent
Chen et al.

(10) Patent No.: US 9,018,337 B2
(45) Date of Patent: Apr. 28, 2015

(54) PROCESS FOR PRODUCING POLYCONDENSATION PRODUCT

(75) Inventors: Liyi Chen, Shanghai (CN); Jan Kluegge, Shanghai (CN)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/980,479

(22) PCT Filed: Jan. 26, 2011

(86) PCT No.: PCT/CN2011/070632
§ 371 (c)(1),
(2), (4) Date: Aug. 23, 2013

(87) PCT Pub. No.: WO2012/100417
PCT Pub. Date: Aug. 2, 2012

(65) Prior Publication Data
US 2013/0331539 A1    Dec. 12, 2013

(51) Int. Cl.
C08G 8/04       (2006.01)
C08G 12/04      (2006.01)
C08G 16/02      (2006.01)
C08G 16/04      (2006.01)
C08G 65/331     (2006.01)

(52) U.S. Cl.
CPC ............ C08G 16/0225 (2013.01); C08G 16/04 (2013.01); C08G 65/331 (2013.01); C08G 65/3315 (2013.01)

(58) Field of Classification Search
CPC ............ C08G 8/28; C08G 8/10; C08G 12/40
USPC ......................................... 528/154, 156, 266
See application file for complete search history.

(56) References Cited

U.S. PATENT DOCUMENTS

| 2,499,370 | A | * | 3/1950 | Bernhard et al. | 516/183 |
| 3,471,576 | A | * | 10/1969 | Lorenz et al. | 568/717 |
| 3,583,486 | A | * | 6/1971 | Stratton | 166/268 |
| 3,674,723 | A | * | 7/1972 | Vredenburgh et al. | 525/133 |
| 3,699,173 | A | * | 10/1972 | Osberg et al. | 568/609 |
| 3,870,681 | A | * | 3/1975 | Falkehag et al. | 525/480 |
| 4,001,329 | A | * | 1/1977 | Bell | 564/326 |
| 4,032,514 | A | * | 6/1977 | Buriks et al. | 525/507 |
| 4,053,447 | A | * | 10/1977 | Shea | 524/594 |
| 4,076,873 | A | * | 2/1978 | Shea | 428/34.5 |
| 4,098,717 | A | * | 7/1978 | Buriks et al. | 516/183 |
| 4,107,127 | A | * | 8/1978 | Shea | 523/222 |
| 4,209,422 | A | * | 6/1980 | Zimmerman et al. | 516/168 |
| 4,473,669 | A | * | 9/1984 | Rupert et al. | 521/177 |
| 4,600,518 | A | * | 7/1986 | Ries et al. | 508/547 |
| 4,725,665 | A | | 2/1988 | Pieh et al. | |
| 4,778,654 | A | * | 10/1988 | Bacskai et al. | 422/7 |
| 4,839,460 | A | * | 6/1989 | Molzahn | 528/230 |
| 4,952,732 | A | * | 8/1990 | Speranza et al. | 564/390 |
| 5,075,414 | A | * | 12/1991 | Dailey, Jr. | 528/129 |
| 5,252,104 | A | * | 10/1993 | Baumann | 8/554 |
| 5,272,226 | A | * | 12/1993 | Lancaster et al. | 525/507 |
| 5,356,938 | A | * | 10/1994 | Weiser et al. | 521/40 |
| 5,372,909 | A | * | 12/1994 | Nishi et al. | 430/192 |
| 5,473,045 | A | * | 12/1995 | Sizensky et al. | 528/129 |
| 5,620,949 | A | * | 4/1997 | Baker et al. | 508/452 |
| 5,637,658 | A | * | 6/1997 | Teodorczyk | 525/480 |
| 5,707,445 | A | | 1/1998 | Yamato et al. | |
| 5,840,795 | A | * | 11/1998 | Freeman et al. | 524/447 |
| 6,780,511 | B2 | * | 8/2004 | Gerber | 428/414 |
| 7,425,596 | B2 | * | 9/2008 | Kraus et al. | 525/329.7 |
| 7,910,640 | B2 | | 3/2011 | Wieland et al. | |
| 2002/0023694 | A1 | * | 2/2002 | Kucera et al. | 148/240 |
| 2005/0003202 | A1 | * | 1/2005 | Gerber | 428/413 |
| 2005/0009980 | A1 | * | 1/2005 | Swedo et al. | 524/494 |
| 2008/0108732 | A1 | | 5/2008 | Wieland et al. | |
| 2009/0054558 | A1 | | 2/2009 | Wieland et al. | |
| 2011/0086974 | A1 | * | 4/2011 | Kawata et al. | 524/594 |
| 2011/0281975 | A1 | | 11/2011 | Kraus et al. | |

FOREIGN PATENT DOCUMENTS

| CN | 101061151 A | 10/2007 |
| CN | 101326136 A | 12/2008 |
| DE | 1 671 017 | 9/1971 |
| EP | 0 214 412 A1 | 7/1986 |
| EP | 1 110 981 A2 | 6/2001 |
| EP | 1 142 847 A2 | 10/2001 |
| WO | WO 2010/040611 A1 | 4/2010 |
| WO | WO 2010/040612 A1 | 4/2010 |

OTHER PUBLICATIONS

PCT/CN2011/070632—International Search Report, Oct. 20, 2011.
PCT/CN2011/070632—International Written Opinion, Oct. 20, 2011.
PCT/CN2011/070632—International Preliminary Report on Patentability, Jul. 30, 2013.

* cited by examiner

*Primary Examiner* — Liam J Heincer
(74) *Attorney, Agent, or Firm* — Curatolo Sidoti Co., LPA; Joseph G. Curatolo; Salvatore A. Sidoti

(57) ABSTRACT

The present invention relates to a process for producing a polycondensation product by polycondensing monomers including (A) an aromatic or heteroaromatic compound containing a polyether chain, (B) optionally an aromatic or heteroaromatic compound which is different from monomer (A), and (C) an aldehyde, in the presence of a protonation catalyst, wherein the aldehyde is provided by a fast-releasing aldehyde source and a slow-releasing aldehyde source.

17 Claims, No Drawings

PROCESS FOR PRODUCING POLYCONDENSATION PRODUCT

CROSS REFERENCE TO RELATED APPLICATIONS

This application is a national stage application of International Application No. PCT/CN2011/070632, filed Jan. 26, 2011, from which application priority is claimed, and which is incorporated herein by reference.

FIELD OF THE INVENTION

The present invention related to a process for producing a polycondensation product by polycondensing monomers including (A) an aromatic or heteroaromatic compound containing a polyether chain, (B) optionally an aromatic of heteroaromatic compound and (C) aldehyde, in the presence of a protonation catalyst.

BACKGROUND OF THE INVENTION

In aqueous suspensions of powdery inorganic or organic substances such as hydraulic binders (e.g. cement, lime, gypsum plaster or anhydrite), rock flour, ground silicate, chalk, clays, porcelain slip, talc, pigments, carbon black or polymer powders, admixtures in the form of dispersants are often added to improve their processibility, i.e. kneadability, flowability, sprayability, paintability or pumpability. These admixtures are able to break up agglomerates and disperse the particles formed as a result of adsorption on the surface of the particles. This leads, particularly in the case of highly concentrated dispersions, to a significant improvement in the processibility.

Conventional cement dispersants or plasticizers which have hitherto mainly been used are salts of naphthalenesulphonic acid-formaldehyde condensates (cf. EP-A 214 412, hereinafter referred to as naphthalenesulphonates), salts of melaminesulphonic acid-formaldehyde condensates (cf. DE 16 71 017) and salts of polycarboxylic acids (cf. U.S. Pat. No. 5,707,445 B1, EP 1 110 981 A2, EP 1 142 847 A2).

As a substitute of the conventional dispersants, US 2008/0108732A1 discloses a polycondensation product consisting of component (A) an aromatic or heteroaromatic compound having 5 to 10 carbon atoms of which some are replaced by heteroatoms in case of heteroaromatic compound, the compound having at least one oxyethylene or oxypropylene group attaching the aromatic or heteroaromatic compound via an O or N atom, optional component (B) at least an aromatic compound selected from phenols, phenol ethers, naphthols, naphthol ethers, anilines, furfuryl alcohols and/or an aminoplast former selected from melamine (derivatives), urea (derivatives) and carboxamides, and component (C) an aldehyde compound selected from the group consisting of formaldehyde, glyoxylic acid and benzaldehyde and mixtures thereof. In some particular embodiments, the polycondensation product contains phosphate moiety.

The polycondensation product is produced by polycondensing components (A) and (C) and optional (B) in aqueous solution in the presence of a protonation catalyst. The catalyst used therein may be inorganic acids such as sulfuric acid.

The process according to US 2008/0108732A1 is disadvantageous in certain aspects. In this process, the aldehyde component (C) is preferably used in the form of aqueous solution, such as formalin. The aqueous solution introduces large amounts of water into the polycondensation system, which lowers down the catalyst concentration, for example, sulfuric acid concentration in the system on the one hand, and demands more energy to keep a suitable reaction temperature, for example 105-110° C., of the system on the other hand. As a consequence, long polymerization time such as 5 hours at 105-110° C. was generally needed to obtain a polymer with a practical molecular weight, e.g. $M_n$ in the range of 18000 to 35000 g/mol, which means the efficiency of polycondensation is not satisfying. In commercial scale, the large amounts of water introduced with the aldehyde components (C) and the long residence time of the reaction materials result in the need of apparatus with large volume. The cost increases accordingly. Besides, during a long time of polycondensation, a loss of formaldehyde in case of a non-pressurized reactor due to its low boiling point (−21° C.) and a partial decomposition of product at high reaction temperature are unavoidable.

A process for producing phosphorylated polycondensation product is disclosed in WO 2010/040611A1, wherein at least one sulfonic acid is used as catalyst instead of sulfuric acid. As described therein, the obtained phosphorylated polycondensation product may be used as an additive for aqueous suspension of hydraulic and/or latent hydraulic binders. A phosphorylated polycondensation product is also disclosed in WO2010/040612A1, which may be used as flow promoter for hydraulic binders.

In the process according to WO 2010/040611A1, no insoluble salt of a catalyst is generated, which makes the process more economical in terms of the work-up procedure. However, it is well known that the cost of sulfonic acid is much higher than that of sulfuric acid.

Both of the processes according to US 2008/0108732A1 and WO 2010/040611A1 are disadvantageous in that the polycondensation period is relatively long. Generally, a period of 5 hours was needed to obtain a polycondensation product with a practical molecular weight, for example, $M_n$ in the range of 18000 to 35000 g/mol.

It was therefore an object of the present invention to provide a process for producing a polycondensation product as dispersant for inorganic binders, with improved polycondensation efficiency.

SUMMARY OF THE INVENTION

It has been surprisingly found that the polycondensation period may be substantially reduced by use of a combination of a fast-releasing aldehyde source and a slow-releasing aldehyde source to provide the desired aldehyde in the preparation of the polycondensation product.

Therefore, the present invention provides a process for producing a polycondensation product and particularly relates to the following aspects.

1. A process for producing a polycondensation product by polycondensing monomers including (A) an aromatic or heteroaromatic compound containing a polyether chain, (B) optionally an aromatic or heteroaromatic compound which is different from monomer (A), and (C) an aldehyde, in the presence of a protonation catalyst, wherein the aldehyde is provided by a fast-releasing aldehyde source and a slow-releasing aldehyde source.

2. The process according to above item 1, wherein the aldehyde is selected from the group consisting of formaldehyde, acetaldehyde, benzaldehyde, benzaldehydesulfonic acid and benzaldehydedisulfonic acid.

3. The process according to above item 1 or 2, wherein the fast-releasing aldehyde source comprises one or more compounds capable of releasing the aldehyde physically.

4. The process according to any of above items 1 to 3, wherein the fast-releasing aldehyde source is an aldehyde solution in an inert solvent.

5. The process according to any of above items 1 to 4, wherein the slow-releasing aldehyde source comprises one or more compounds capable of gradually releasing the aldehyde chemically.

6. The process according to above item 5, wherein the one or more compounds capable of gradually releasing the aldehyde chemically are paraformaldehyde, tetraacetaldehyde or acetals.

7. The process according to above item 1, wherein the fast-releasing aldehyde source is formalin and the slow-releasing aldehyde source is paraformaldehyde.

8. The process according to any of above items 1 to 7, wherein the molar ratio of the aldehyde from the fast-releasing aldehyde source and that from the slow-releasing aldehyde source is in the range of 5:1 to 1:1.

9. The process according to above item 8, wherein the molar ratio of the aldehyde from the fast-releasing aldehyde source and that from the slow-releasing aldehyde source is in the range of 2.5:1 to 2:1.

10. The process according to any of above items 1 to 9, wherein the catalyst is strong inorganic acids.

11. The process according to above item 10, wherein the catalyst is 95-98% concentrated sulfuric acid.

12. The process according to any of above items 1 to 11, wherein monomer (A) is an aromatic or heteroaromatic compound containing a polyoxyalkylene chain, which is represented by formula (I),

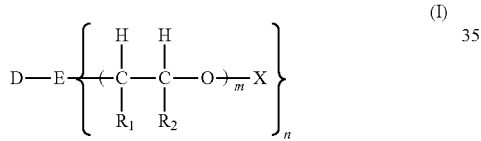

wherein
D is an unsubstituted or substituted aromatic or heteroaromatic group having from 5 to 10 ring members;
$R_1$ is a group selected from H, $C_1$-$C_{10}$-alkyl, $C_3$-$C_8$-cycloalkyl, $C_6$-$C_{10}$-aryl and 5 to 10 membered heteroaryl;
$R_2$ is a group selected from H, $C_1$-$C_{10}$-alkyl, $C_3$-$C_8$-cycloalkyl, $C_6$-$C_{10}$-aryl and 5 to 10 membered heteroaryl;
X is a group selected from H, $C_1$-$C_{10}$-alkyl, $C_3$-$C_8$-cycloalkyl, $C_6$-$C_{10}$-aryl, 5 to 10 membered heteroaryl and $C_1$-$C_{10}$-alkylcarbonyl;
E is —O—, —NH—, or —N—;
n is 1, when E is —O— or —NH—; or n is 2, when E is —N—; and
m is an integer from 1 to 300.

13. The process according to above item 12, wherein D in formula (I) is phenyl or naphthyl, each being optionally substituted by one or more substituents selected from the group consisting of OH, —OR$_3$, —NH$_2$, —NHR$^3$, —NR$^3_2$, $C_1$-$C_{10}$-alkyl, —SO$_3$H, —COOH, —PO$_3$H$_2$ and —OPO$_3$H$_2$, where the $C_1$-$C_{10}$-alkyl are optionally substituted by phenyl or 4-hydroxyphenyl, R$_3$ is a $C_1$-$C_4$-alkyl.

14. The process according to above item 11, wherein D in formula (I) is selected from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and 4-methoxynaphthyl.

15. The process according to above item 14, wherein D in formula (I) is phenyl.

16. The process according to any of above items 12 to 15, wherein $R_1$ in formula (I) is H, methyl, ethyl or phenyl.

17. The process according to above item 16, wherein $R_1$ in formula (I) is H or methyl.

18. The process according to above item 17, wherein $R_1$ in formula (I) is H.

19. The process according to any of above items 12 to 18, wherein $R_2$ in formula (I) is H, methyl, ethyl or phenyl.

20. The process according to above item 19, wherein $R_2$ in formula (I) is H or methyl.

21. The process according to above item 20, wherein $R_2$ in formula (I) is H.

22. The process according to any of above items 12 to 21, wherein X in formula (I) is H.

23. The process according to any of above items 12 to 22, wherein m is 10 to 160.

24. The process according to above item 12, wherein the monomer (A) is an adduct of 1 mol phenol, cresol, catechol, resorcinol, nonylphenol, methoxyphenol, naphthol, methylnaphthol, butylnaphthol, bisphenol A, aniline, methylaniline, hydroxyaniline, methoxyaniline and/or salicylic acid with 1 to 300 mol of an alkylene oxide.

25. The process according to any of above items 1 to 24, wherein the monomer (B) is an aromatic or heteroaromatic compound, which is represented by formula (II),

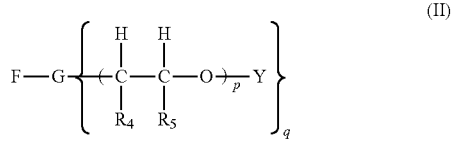

F is an unsubstituted or substituted aromatic or heteroaromatic group having from 5 to 10 ring members;
$R_4$ is a group selected from H, $C_1$-$C_{10}$-alkyl, $C_3$-$C_8$-cycloalkyl, $C_6$-$C_{10}$-aryl and 5 to 10 membered heteroaryl;
$R_5$ is a group selected from H, $C_1$-$C_{10}$-alkyl, $C_3$-$C_{10}$-cycloalkyl, $C_6$-$C_{10}$-aryl and 5 to 10 membered heteroaryl;
Y is a group selected from H, $C_1$-$C_{10}$-alkyl, —COOH, $C_1$-$C_4$-alkyl-COOH, —SO$_3$H, $C_1$-$C_4$-alkyl-SO$_3$H, —PO$_3$H$_2$ and $C_1$-$C_4$-alkyl-PO$_3$H$_2$;
G is —O—, —NH— or —N—;
q is 1, when G is —O— or —NH—; or q is 2, when G is —N—; and
p is an integer from 0 to 300.

26. The process according to above item 25, wherein F in formula (II) is phenyl or naphthyl, each being optionally substituted by one or more substituents selected from the group consisting of OH, —OR$^3$, —NH$_2$, —NHR$^3$, —NR$^3_2$, $C_1$-$C_{10}$-alkyl, —SO$_3$H, —COOH, —PO$_3$H$_2$ and —OPO$_3$H$_2$, where the $C_1$-$C_{10}$-alkyl are optionally substituted by phenyl or 4-hydroxyphenyl, R$^3$ is a $C_1$-$C_4$-alkyl.

27. The process according to above item 25, wherein F in formula (II) is selected from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and 4-methoxynaphthyl.

28. The process according to above item 27, wherein F in formula (II) is phenyl.

29. The process according to any of above items 25 to 28, wherein $R_4$ is H, methyl, ethyl or phenyl.

30. The process according to above item 29, wherein R₄ is H or methyl.

31. The process according to above item 30, wherein R₄ is H.

32. The process according to any of above items 25 to 31, wherein R₅ is H, methyl, ethyl or phenyl.

33. The process according to above item 32, wherein R₅ is H or methyl.

34. The process according to above item 33, wherein R₅ is H.

35. The process according to any of above items 25 to 34, wherein Y is H.

36. The process according to above item 25, wherein the monomer (B) is selected from the group consisting of phenol, phenoxyacetic acid, phenoxyethanol, phenoxyethanol phosphates, phenoxydiglycol, phenoxy(poly)ethyleneglycol phosphates, phenoxydiglycol phosphate, methoxyphenol, resorcinol, cresol, bisphenol A, nonylphenol, aniline, methylaniline, N-phenyldiethanolamine, N,N-di(carboxyethyl) aniline, N,N-di(carboxymethyl) aniline, N-phenyldiethanolamine diphosphate, phenolsulphonic acid and anthranilic acid.

37. The process according to above item 25, wherein the monomer (B) is 2-phenoxyethanol phosphate.

38. The process according to any of above items 1 to 37, wherein the molar ratio of monomers (C):(A)+(B) is in the range of 100:1 to 1:10.

39. The process according to above item 38, wherein the molar ratio of monomers (C):(A)+(B) is in the range of 10:1 to 1:1.

40. The process according to any of above items 1 to 39, wherein the molar ratio of monomers (A):(B) is in the range of 10:1 to 1:0 when monomer (B) is used.

41. The process according to any of above items 1 to 40, wherein the polycondensation is carried out at a temperature in the range of 20 to 140° C.

42. The process according to above item 41, wherein the polycondensation is carried out at a temperature in the range of 60 to 140° C.

43. The process according to above item 42, wherein the polycondensation is carried out at a temperature in the range of 100 to 120° C.

44. The process according to any of above items 1 to 43, wherein the polycondensation is carried out at a pressure in the range of $1 \times 10^5$ Pa to $10 \times 10^5$ Pa.

45. The process according to above item 44, wherein the polycondensation is carried out at atmospheric pressure.

DETAILED DESCRIPTION OF THE INVENTION

The present invention relates to a process for producing a polycondensation product by polycondensing monomers including (A) an aromatic or heteroaromatic compound containing a polyether chain, (B) optionally an aromatic or heteroaromatic compound which is different from monomer (A), and (C) an aldehyde, in the presence of a protonation catalyst, wherein the aldehyde is provided by a fast-releasing aldehyde source and a slow-releasing aldehyde source.

The monomer (A) is an aromatic or heteroaromatic compound containing a polyether chain.

In a particular embodiment, the monomer (A) is an aromatic or heteroaromatic compound containing a polyoxyalkylene chain, which is represented by formula (I),

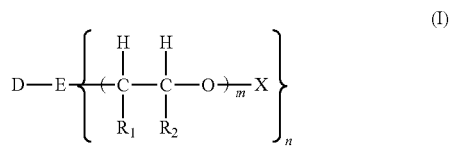

wherein

D is an unsubstituted or substituted aromatic or heteroaromatic group having from 5 to 10 ring members;

$R_1$ is a group selected from H, $C_1$-$C_{10}$-alkyl, preferably $C_1$-$C_4$-alkyl, $C_3$-$C_8$-cycloalkyl, $C_6$-$C_{10}$-aryl and 5 to 10 membered heteroaryl;

$R_2$ is a group selected from H, $C_1$-$C_{10}$-alkyl, preferably $C_1$-$C_4$-alkyl, $C_3$-$C_8$-cycloalkyl, $C_6$-$C_{10}$-aryl and 5 to 10 membered heteroaryl;

X is a group selected from H, $C_1$-$C_{10}$-alkyl, $C_3$-$C_8$-cycloalkyl, $C_6$-$C_{10}$-aryl, 5 to 10 membered heteroaryl and $C_1$-$C_{10}$-alkylcarbonyl, preferably $C_1$-$C_4$-alkylcarbonyl;

E is —O—, —NH—, or —N—;

n is 1, when E is —O— or —NH—; or n is 2, when E is —N—; and m is an integer from 1 to 300.

It will be understood that each m may be same or different when n is 2, and the same is applicable to X, $R_1$ and $R_2$. That is to say, the two chains may be same or differenct when n is 2.

It will also be understood that each $R_1$ may be same or different when m is more than 1, and the same is applicable to $R_2$. That is to say, the polyoxyalkylene chain(s) may be a homopolymeric chain consisted of one single type of oxyalkylene unit or a copolymeric chain consisted of two or more types of oxyalkylene units in random order or in the form of a block structure.

In the context of the present invention, the term $C_1$-$C_{10}$-alkyl denotes straight chain or branched alkyl having 1 to 10 carbon atoms, for example, methyl, ethyl, n-propyl, isopropyl, n-butyl, isobutyl, sec-butyl, tert-butyl, n-pentyl, isopentyl, sec-pentyl, neopentyl, 1,1-dimethylpropyl, 1,2-dimethylpropyl, n-hexyl, isohexyl, sec-hexyl, neohexyl, 3-methylpentyl, 1,1-dimethylbutyl, 1,3-dimethylbutyl, 1-ethylbutyl, 1-methyl-1-ethylpropyl, n-heptyl and the isomers thereof, n-octyl and the isomers thereof, n-nonyl and the isomers thereof, and n-decyl and the isomers thereof.

In the context of the present invention, the term $C_1$-$C_4$-alkyl denotes straight chain or branched alkyl having 1 to 4 carbon atoms, for example, methyl, ethyl, n-propyl, isopropyl, n-butyl, isobutyl, sec-butyl and tert-butyl.

In the context of the present invention, the term $C_3$-$C_8$-cycloalkyl denotes cycloalkyl containing one or two rings which may be attached together in a pendent manner or may be fused and having 3 to 8 carbon atoms in the ring(s), for example, cyclopropyl, cyclobutyl, cyclopentyl, cyclohexyl, cycloheptyl and cyclooctyl, any of which can be substituted by one or more, usually one or two, $C_1$-$C_4$-alkyl.

In the context of the present invention, the term $C_6$-$C_{10}$-aryl denotes aryl containing one or two rings which may be attached together in a pendent manner or may be fused and having 6 to 10 carbon atoms in the ring(s), for example, phenyl, o-tolyl, m-tolyl, p-tolyl, 1-naphthyl, 2-naphthyl and indenyl.

In the context of the present invention, the term 5 to 10 membered heteroaryl denotes a monocyclic or bicyclic radical of 5 to 10 ring atoms having at least one aromatic ring containing one, two, or three heteroatoms selected from N, O, S or P, the remaining ring atoms being C, with the understanding that the attachment point of the heteroaryl will be on the aromatic ring, for example, furyl, thienyl, imidazolyl, oxazolyl, isoxazolyl, thiazolyl, isothiazolyl, oxadiazolyl, thiadiazolyl, pyrazinyl, thienyl, benzothienyl, furyl, pyranyl, pyridyl, pyrrolyl, pyrazolyl, pyrimidyl, quinolinyl, isoquinolinyl, benzofuryl, benzothienyl, benzothiopyranyl, benzimidazolyl, benzoxazolyl, benzoxadiazolyl, benzothiazolyl, benzothiadiazolyl, benzopyranyl, indolyl, isoindolyl, triazolyl, triazinyl, quinoxalinyl, purinyl, quinazolinyl, quinolizinyl, naphthyridyl.

In the context of the present invention, the term "unsubstituted or substituted" means unsubstituted or substituted by one or more substituents selected from the group consisting of $C_1$-$C_{10}$-alkyl, preferably $C_1$-$C_4$-alkyl; halogen, such as fluorine, chlorine or bromine; hydroxyl; $C_1$-$C_{10}$-alkoxy, preferably $C_1$-$C_4$-alkoxy, such as methoxy, ethoxy, propoxy and butoxy; amino, $C_1$-$C_4$-alkylamino, di-$C_1$-$C_4$-alkylamino, —$SO_3H$, —COOH, —$PO_3H_2$, —$OPO_3H_2$, unless otherwise stated.

The number m in formula (I) is preferably at least 1, 5, 10, 12 or 20 and at most 300, 280, 200, 160 or 120. In a particulary embodiment, m is in the range of 1 to 300, preferably 5 to 280, more preferably 10 to 200, even more preferably 10 to 160, and most preferably 12 to 120.

The group D is, for example, selected from unsubstituted or substituted phenyl, naphthyl, furyl, thienyl, pyrrolyl, imidazolyl, pyrazolyl, isothiazolyl, thiazolyl, isoxazolyl, oxazolyl, triazolyl, thiadiazolyl, pyridyl, pyrazolyl, pyrimidinyl, quinolinyl, isoquinolinyl, quinoxalinyl, naphthyridyl, benzothienyl, benzofuryl, indolyl and benzoxadiazolyl.

In a preferred embodiment, the group D is phenyl or naphthyl, each being optionally substituted by one or more substituents selected from the group consisting of OH, —$OR_3$, —$NH_2$, —$NHR^3$, —$NR^3{}_2$, $C_1$-$C_{10}$-alkyl, —$SO_3H$, —COOH, —$PO_3H_2$ and —$OPO_3H_2$, where the $C_1$-$C_{10}$-alkyl are optionally substituted by phenyl or 4-hydroxyphenyl, $R_3$ is a $C_1$-$C_4$-alkyl. More preferably, D is selected from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and 4-methoxynaphthyl. Most preferably, D is phenyl.

$R_1$ and $R_2$, independently from each other, are preferably selected from H, methyl, ethyl and phenyl, wherein H or methyl, especially H is more preferable.

X is preferably H.

The monomer (A) is for example an adduct of 1 mol of phenol, cresol, catechol, resorcinol, nonylphenol, methoxyphenol, naphthol, methylnaphthol, butylnaphthol, bisphenol A, aniline, methylaniline, hydroxyaniline, methoxyaniline and/or salicylic acid with 1 to 300 mol, preferably 5 to 280, more preferably 10 to 200, even preferably from 10 to 160, and most preferably 12 to 120 mol of an alkylene oxide, preferably ethylene oxide or propylene oxide.

From the point of view of a condensation with aldehyde which is easy to carry out, the monomer (A) is preferably an adduct of a benzene derivative which is optionally substituted by a $C_1$-$C_{10}$-alkyl with an alkylene oxide, particularly preferably an adduct of phenol with an alkylene oxide. More particularly, the alkylene is for example ethylene oxide or propylene oxide.

The most preferable monomer (A) is polyoxyethylene monophenyl ether with 10 to 160, preferably 12 to 120 oxyethylene units.

The monomer (B) is an aromatic or heteroaromatic compound which is different from monomer (A). Monomer (B) is optional in the process for preparing a polycondensation product according to the present invention. However, monomer (B), if used, may act as an anchor on the backbone of the obtained polycondensate product, through which the affinity of polymer chain of the polycondensate product for the surface of inorganic grains may be relatively enhanced.

In a particular embodiment, the monomer (B) is an aromatic or heteroaromatic compound, which is represented by formula (II),

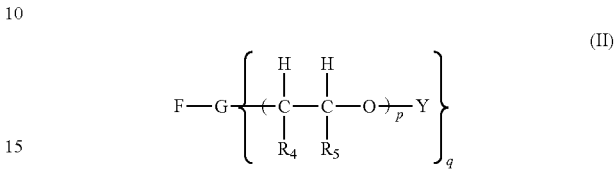

F is an unsubstituted or substituted aromatic or heteroaromatic group having from 5 to 10 ring members;

$R_4$ is a group selected from H, $C_1$-$C_{10}$-alkyl, preferably $C_1$-$C_4$-alkyl, $C_3$-$C_8$-cycloalkyl, $C_6$-$C_{10}$-aryl and 5 to 10 membered heteroaryl;

$R_5$ is a group selected from H, $C_1$-$C_{10}$-alkyl, preferably $C_1$-$C_4$-alkyl, $C_3$-$C_8$-cycloalkyl, $C_6$-$C_{10}$-aryl and 5 to 10 membered heteroaryl;

Y is a group selected from H, $C_1$-$C_{10}$-alkyl, —COOH, $C_1$-$C_4$-alkyl-COOH, —$SO_3H$, $C_1$-$C_4$-alkyl-$SO_3H$, —$PO_3H_2$ and $C_1$-$C_4$-alkyl-$PO_3H_2$;

G is —O—, —NH— or —N—;

q is 1, when G is —O— or —NH—; or q is 2, when G is —N—; and p is an integer from 0 to 300.

It will be understood that each p may be same or different when q is 2, and the same is applicable to Y, $R_4$ and $R_5$. That is to say, the two chains may be same or different when q is 2.

It will also be understood that each $R_4$ may be same or different when p is more than 1, and the same is applicable to $R_5$. That is to say, the polyoxyalkylene chain(s) may be a homopolymeric chain consisted of one single type of oxyalkylene unit or a copolymeric chain fconsisted of two or more types of oxyalkylene units in random order or in the form of a block structure.

For the terms "$C_1$-$C_{10}$-alkyl", "$C_1$-$C_4$-alkyl", "$C_3$-$C_8$-cycloalkyl", "$C_6$-$C_{10}$-aryl", "5 to 10 membered heteroaryl" and "unsubstituted or substituted", the definitions provided for monomer (A) are applicable here.

The group F is, for example, selected from unsubstituted or substituted phenyl, naphthyl, furyl, thienyl, pyrrolyl, imidazolyl, pyrazolyl, isothiazolyl, thiazolyl, isoxazolyl, oxazolyl, triazolyl, thiadiazolyl, pyridyl, pyrazolyl, pyrimidinyl, quinolinyl, isoquinolinyl, quinoxalinyl, naphthyridyl, benzothienyl, benzofuryl, indolyl and benzoxadiazolyl.

In a preferred embodiment, the group F is phenyl or naphthyl, each being optionally substituted by one or more substituents selected from the group consisting of OH, —$OR_3$, —$NH_2$, —$NHR^3$, —$NR^3{}_2$, $C_1$-$C_{10}$-alkyl, —$SO_3H$, —COOH, —$PO_3H_2$ and —$OPO_3H_2$, where the $C_1$-$C_{10}$-alkyl are optionally substituted by phenyl or 4-hydroxyphenyl, $R_3$ is a $C_1$-$C_4$-alkyl. More preferably, F is selected from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and 4-methoxynaphthyl. Most preferably, F is phenyl.

$R_4$ and $R_5$, independently from each other, are preferably selected from H, methyl, ethyl and phenyl, wherein H or methyl, especially H is more preferable. Y is preferably H.

In a preferred embodiment, the monomer (B) is an aromatic compound or heteroaromatic compound selected from the group consisting of unsubstituted or substituted phenols, unsubstituted or substituted phenol ethers, unsubstituted or substituted naphthols, unsubstituted or substituted naphthol ethers, and unsubstituted or substituted anilines.

Specific examples of the monomer (B) are phenol, phenoxyacetic acid, phenoxyethanol, phenoxyethanol phosphates, phenoxydiglycol, phenoxy(poly)ethyleneglycol phosphates, phenoxydiglycol phosphate, methoxyphenol, resorcinol, cresol, bisphenol A, nonylphenol, aniline, methylaniline, N-phenyldiethanolamine, N,N-di(carboxyethyl) aniline, N,N-di(carboxymethyl) aniline, N-phenyldiethanolamine diphosphate, phenolsulphonic acid and anthranilic acid. Preferably, monomer (B) is 2-phenoxyethanol phosphate.

The monomer (C) is an aldehyde, which is provided by a fast-releasing aldehyde source and a slow-releasing aldehyde source.

The aldehyde may be any one useful for preparing the polycondensation product known in the art.

In a specific embodiment of the present invention, aldehyde includes, but not limited to, formaldehyde, acetaldehyde, glyoxylic acid and benzaldehyde. Said benzaldehyde may optionally bear one or more acid groups of formulae $COOM_w$, $SO_3M_w$ or $PO_3M_w$ in which M=H, alkali metal or alkaline earth metal, ammonium or an organic amine radical and w may be ½, 1 or 2. More particularly, said alkali metal is selected from Li, Na, K, Rb or Cs, in particular Na and K. Said alkaline earth metal is selected from Mg, Ca, Sr and Ba. The benzaldehyde bearing one or more acid groups is for example benzaldehydesulfonic acid or benzaldehydedisulfonic acid.

Herein, the fast-releasing aldehyde source is to be understood as a reagent comprising one or more compounds capable of releasing the aldehyde physically under the polycondensation condition, preferably in the form of a aldehyde solution in an inert solvent, which considerably simplifies metering or mixing of the monomers, especially for industrial production; more preferably in the form of an aqueous solutions. Generally, the concentration of the aldehyde in the solution is 30-70 wt %. However, it is also possible to use the pure crystalline or pulverulent aldehydes or their hydrates.

Accordingly, formalin or solutions of acetaldehyde, glyoxylic acid, benzaldehyde, benzaldehydesulfonic acid or benzaldehydedisulfonic acid are preferred.

The slow-releasing aldehyde source is to be understood as a reagent comprising one or more compounds capable of gradually releasing the aldehyde chemically under the polycondensation conditions. Said one or more compounds capable of gradually releasing aldehyde chemically may be any compounds which release aldehyde under the polycondensation condition via chemical reaction, such as hydrolysis.

In a specific embodiment, said one or more compounds capable of gradually releasing aldehyde chemically is paraformaldehyde, tetraacetaldehyde and the like, or acetals, for example the acetals derived from formaldehyde, acetaldehyde, benzaldehyde, benzaldehydesulfonic acid, benzaldehydedisulfonic acid or the like.

It is to be understood that the two aldehyde sources provide the desired aldehyde by releasing the aldehyde into the polycondensation system in different speeds.

The two aldehyde sources may be introduced into the polycondensation system simultaneously, for example as a mixture, or successively, especially in the order of the slow-releasing aldehyde source followed by the fast-releasing aldehyde source.

From an industry point of view, it is preferable that at least one of the aldehyde sources is in a liquid form. More preferably, the two aldehyde sources are mixed as a solution or suspension before introducing into the polycondensation system.

The molar ratio between the aldehyde from the fast-releasing aldehyde source and that from the slow-releasing aldehyde source is in the range of 5:1 to 1:1, preferably 2.5:1-2:1.

In a preferable specific embodiment, the fast-releasing aldehyde source is formalin, and the slow-releasing aldehyde source is paraformaldehyde.

The monomer (A), the optional monomer (B) and the monomer (C) can be used in a molar ratio varied within a broad range. For example, the molar ratio of monomers (C): (A)+(B) is in the range of 100:1 to 1:0, preferably 10:1 to 1:1, and the molar ratio of monomers (A):(B) is in the range of 10:1 to 1:0 when monomer (B) is used.

The specific polymerization procedure and corresponding conditions are not particularly limited. The polymerization process can be carried out in accordance with the process for producing a polycondensation product known in the art.

The polycondensation process of the present invention may be carried out by polycondensing the monomers (A), (B) and (C) at a temperature in the range of 20 to 140° C., preferably 60 to 140° C., more preferably 80 to 130° C., most preferably 100 to 120° C. The pressure at which the polycondensation is carried out is for example in the range of $1 \times 10^5$ Pa to $10 \times 10^5$ Pa, preferably $1 \times 10^5$ Pa to $3 \times 10^5$ Pa, more preferably atmospheric pressure.

Any catalysts for polycondensation known in the art may be used in the process of the present invention. The catalyst is, for example, Bronsted acids. Preferably the catalyst is strong inorganic acids, such as hydrochloric acid, phosphoric acid, sulfuric acid or the like. Particular preference is given to sulfuric acid, e.g. concentrated sulfuric acid, especially 95-98% concentrated sulfuric acid. Organic acids may also be used in the process of the present invention, such as sulfonic acid. Among the useful Bronsted acids, concentrated sulfuric acid is most preferred in view of the fact that it has the dehydratioin or water absorbtion capability, which may assist the water elimination during the polycondensation.

In a specific embodiment of the present invention, the 95-98% concentrated sulfuric acid is used as the catalyst. The molar ratio of the 95-98% concentrated sulfuric acid to the monomer(A) is in the range of 1:5 to 5:1, preferably 1:3 to 1:1, most preferably 1:2 to 1:1.

For example, the process of the present invention may be carried out by adding the monomers (A) and optional (B) in any order, preferably in the order of the monomer (A) followed by the monomer (B) if used, into a reactor with stirring, and then adding the two aldehyde sources providing the monomer (C) into the mixture of monomers (A) and optional (B), followed by adding the catalyst gradually. Alternatively, the two aldehyde sources are added into the reactor as a mixture, for example in the form of solution or suspension. In this case, the catalyst may be added into the reactor separately or in a mixture with the two aldehyde sources.

Any customary reactor may be used in the process of the present invention, for example, a glass reactor or a ceramic reactor for polycondensation, a stainless steel reactor or a carbon steel reactor for neutralization.

The progress of the polycondensation is characterized by a distinct increase in the viscosity. When the desired viscosity has been reached, the polycondensation is stopped by cooling and neutralizing with a basic compound. The neutralization of the polycondensation system is carried out using the customary alkaline compounds or salts, in particular alkaline hydroxides. Preference is given to using sodium hydroxide, for example as aqueous solution. Preferably, the neutralization is carried out to adjust the reaction mixture to a pH in the range of 6 to 11.

It is also possible, within the scope of the present invention, for the salt such as sodium sulfate formed in the neutralization to be separated off after conclusion of the polycondensation reaction from bottom, for which purpose recourse can be made to various possibilities, for example those described in US 2008/0108732A1.

It is conceivable for a person skilled in the art that the polycondensation process of the present invention may also be carried out as a continuous process, especially in an industry scale.

The present invention also relates to the use of the polycondensation products obtained by the process according to the present invention as dispersant for inorganic binder, especially in construction materials such as concrete, mortar or grout, to increase their processibility.

The invention will be further illustrated by the following examples, which set forth particularly advantageous embodiment. While the examples are provided to illustrate the present invention, they are not intended to limit it.

EXAMPLES

1. Preparation Examples

Comparative Example 1.1

Only with Formalin

2-Phenoxyethanol (96%, 16.92 g) is added into a reactor equipped with a jacket set to 70° C. and a mechanical impeller. Polyphosphoric acid (80% in $P_2O_5$, 9.60 g) is added into the reactor while 2-phenoxyethanol is stirred. The mixture is stirred at 80° C. for 30 min followed by feeding polyoxyethylene monophenyl ether (96%, $M_n$=5000 g/mol, 200 g). The mixture is then heated to 100° C. Concentrated sulfuric acid (96%, 6.10 g) and formalin (37%, 14.04 g) are added into the mixture and then the mixture is heated to 110-115° C. and stirred for 2 hours. Afterwards the mixture is allowed to cool down to 60° C. and a 32 wt % aqueous solution of sodium hydroxide is added to neutralize the mixture to pH 8.4. The obtained polycondensate has a molecular weight $M_n$=16700 g/mol with $M_w/M_n$=1.38, determined by gel permeation chromatography.

Comparative Example 1.2

Only with Paraformaldehyde

2-Phenoxyethanol (96%, 16.92 g) is added into a reactor equipped with a jacket set to 70° C. and a mechanical impeller. Polyphosphoric acid (80% in $P_2O_5$, 9.60 g) is added into the reactor while 2-phenoxyethanol is stirred. The mixture is stirred at 80° C. for 30 min followed by feeding polyoxyethylene monophenyl ether (96%, $M_n$=5000 g/mol, 200 g). The mixture is then heated to 100° C. Methanesulfonic acid (70%, 8.40 g) and Paraformaldehyde (94%, 5.75 g) are added into the mixture and then the mixture is heated to 110-115° C. and stirred for 4 hours. Afterwards the mixture is allowed to cool down to 60° C. and a 32 wt % aqueous solution of sodium hydroxide is added to neutralize the mixture to pH 9.1. The obtained polycondensate has a molecular weight $M_n$=20800 g/mol with $M_w/M_n$=1.67, determined by gel permeation chromatography.

Example 1.1

2-Phenoxyethanol (96%, 16.92 g) is added into a reactor equipped with a jacket set to 70° C. and a mechanical impeller. Polyphosphoric acid (80% in $P_2O_5$, 9.60 g) is added into the reactor while 2-phenoxyethanol is stirred. The mixture is stirred at 80° C. for 30 min followed by feeding polyoxyethylene monophenyl ether (96%, $M_n$=5000 g/mol, 200 g). The mixture is then heated to 100° C. Concentrated sulfuric acid (96%, 6.10 g), formalin (37%, 9.36 g) and paraformaldehyde (94%, 1.92 g) are added into the mixture and then the mixture is heated to 110-115° C. and stirred for 2 hours. Afterwards the mixture is allowed to cool down to 60° C. and a 32 wt % aqueous solution of sodium hydroxide is added to neutralize the mixture to pH 9.1. The obtained polycondensate has a molecular weight $M_n$=21800 g/mol with $M_w/M_n$=1.80, determined by gel permeation chromatography.

Example 1.2

2-Phenoxyethanol (96%, 16.92 g) is added into a reactor equipped with a jacket set to 70° C. and a mechanical impeller. Polyphosphoric acid (80% in $P_2O_5$, 9.60 g) is added into the reactor while 2-phenoxyethanol is stirred. The mixture is stirred at 80° C. for 30 min followed by feeding polyoxyethylene monophenyl ether (96%, $M_n$=5000 g/mol, 200 g). The mixture is then heated to 100° C. Concentrated sulfuric acid (96%, 4.57 g), formalin (37%, 9.36 g) and paraformaldehyde (94%, 1.92 g) are added into the mixture and then the mixture is heated to 110-115° C. and stirred for 2.5 hours. Afterwards the mixture is allowed to cool down to 60° C. and a 32 wt % aqueous solution of sodium hydroxide is added to neutralize the mixture to pH 10.6. The obtained polycondensate has a molecular weight $M_n$=20300 g/mol with $M_w/M_n$=1.67, determined by gel permeation chromatography.

Example 1.3

2-Phenoxyethanol (96%, 16.92 g) is added into a reactor equipped with a jacket set to 70° C. and a mechanical impeller. Polyphosphoric acid (80% in $P_2O_5$, 9.60 g) is added into the reactor while 2-phenoxyethanol is stirred. The mixture is stirred at 80° C. for 30 min followed by feeding polyoxyethylene monophenyl ether (96%, $M_n$=5000 g/mol, 200 g). The mixture is then heated to 100° C. Concentrated sulfuric acid (96%, 6.10 g), formalin (37%, 11.70 g) and paraformaldehyde (94%, 1.92 g) are added into the mixture and then the mixture is heated to 110-115° C. and stirred for 2 hours. Afterwards the mixture is allowed to cool down to 60° C. and a 32 wt % aqueous solution of sodium hydroxide is added to neutralize the mixture to pH 9.7. The obtained polycondensate has a molecular weight $M_n$=19700 g/mol with $M_w/M_n$=1.65, determined by gel permeation chromatography.

Example 1.4

2-Phenoxyethanol (96%, 16.92 g) is added into a reactor equipped with a jacket set to 70° C. and a mechanical impeller. Polyphosphoric acid (80% in $P_2O_5$, 9.60 g) is added into the reactor while 2-phenoxyethanol is stirred. The mixture is stirred at 80° C. for 30 min followed by feeding polyoxyethylene monophenyl ether (96%, $M_n$=5000 g/mol, 200 g). The mixture is then heated to 100° C. Concentrated sulfuric acid (96%, 9.15 g), formalin (37%, 11.70 g) and paraformaldehyde (94%, 0.96 g) are added into the mixture and then the mixture is heated to 110-115° C. and stirred for 1.5 hours. Afterwards the mixture is allowed to cool down to 60° C. and a 32 wt % aqueous solution of sodium hydroxide is added to neutralize the mixture to pH 8.9. The obtained polycondensate has a molecular weight $M_n$=22600 g/mol with $M_w/M_n$=1.78, determined by gel permeation chromatography.

In Comparative Example 1.1 using formalin alone, a polycondensation product with a lower molecular weight is obtained over 2 hours, compared with the polycondensation product obtained by the process of present invention. In Comparative Example 1.2 using paraformaldehyde alone, the polycondensation period is much longer, almost two times longer than that of the process of the present invention, although similar molecular weights of the polycondensation products are achieved. It is evident from the Examples that by the process of the present invention, the polycondensation period is shortened to 1.5-2.5 hours to obtain a polycondensation product with a practical molecular weight $M_n$ in the range of 18000 to 35000 g/mol.

With the significantly reduced polycondensation period, a very comparable or even better product performance in concrete test as shown in the Table 1-2 below is achieved through the process of the present invention.

2. Concrete test for the performances of the polycondensation products obtained by the process of the present invention (Ex. 1.1-1.4) and the polycondensation products obtained in Comparative Examples 1.1 and 1.2 (Com. Ex. 1.1 and 1.2).

The results are summarized in Table 1.

TABLE 1

| Time (min) | Com. Ex. 1.1 | Com. Ex. 1.2 | Ex. 1.1 | Ex. 1.2 | Ex. 1.3 |
|---|---|---|---|---|---|
| Slump Test, cm | | | | | |
| 3 | 23.0 | 24.5 | 25.5 | 25.5 | 25.0 |
| 30 | 20.5 | 22.0 | 24.0 | 24.0 | 22.5 |
| 60 | 16.0 | 21.0 | 21.0 | 23.0 | 20.5 |
| Slump Flow Test, cm | | | | | |
| 3 | 44.5 | 57.5 | 61.0 | 64.0 | 63.5 |
| 30 | 34.0 | 42.0 | 52.5 | 49.0 | 41.5 |
| 60 | 27.0 | 32.5 | 35.5 | 39.5 | 33.0 |

According to the data in Table 1, the polycondensation products from Ex. 1.1-1.3 show very comparable or even better performance in both slump test and slump flow test, compared with Com. 1.1-1.2.

2.2 Test in accordance with JIS A 1101 (a slump test, which is slightly modified from ISO 4109) and JIS A 1150 (a slump flow test, which is slightly modified from ISO 1920-2).

Cement: Taiheiyo OPC (52.5), Taiheiyo Cement Corporation,

Temperature: 20° C.

The results are summarized in Table 2.

TABLE 2

| | Slump Test, cm (w/c: 0.45:1, by weight; dosage*: 0.100 wt %) | | | Slump Flow Test, cm (w/c: 0.30:1, by weight; dosage*: 0.205 wt %) | | |
|---|---|---|---|---|---|---|
| Time (min) | Com. Ex. 1.2 | Ex. 1.1 | Ex. 1.4 | Com. Ex. 1.2 | Ex. 1.1 | Ex. 1.4 |
| 0 | 20.5 | 20.5 | 20.5 | 51.5 | 52.5 | 52.0 |
| 5 | 17.0 | 17.0 | 17.5 | 59.0 | 59.5 | 60.0 |
| 15 | 11.0 | 10.5 | 11.5 | 45.0 | 44.5 | 45.3 |
| 30 | 6.5 | 7.0 | 6.5 | 31.0 | 30.5 | 33.0 |

*: as defined in the above test 2.1

Slump test and slump flow test are two important methods to evaluate consistency and workability of a fresh concrete mix. In a slump test, the slump retention capability of a dispersant such as polycondensation product of the present invention in a fresh concrete mix is characterized by the change of its slump height with an increasing time scale. In a slump flow test, the flowability of a fresh concrete mix is characterized by the diameter of a round-shape flow of the concrete sample with an increasing time scale. Generally, with increasing time after concrete mixing, a concrete sample becomes more and more stiff due to cement hydration; therefore its slump height and slump flow diameter become smaller. Dispersants used in the concrete can prevent such values from fast decreasing.

2.1 Test in Accordance with ASTM C143

Cement: Onoda Cement (52.5), Jiang Nan-Onoda Cement Co., Ltd,

Temperature: 25° C., water to cement (w/c): 0.37:1, by weight

Dosage: 0.14 wt %, corresponding to the ratio of the dispersant as solid to the cement amount.

According to the data in Table 2, it is clear that at a higher water/cement ratio (w/c) (0.45), the polycondensation products from Ex. 1.1 and Ex. 1.4 showed a very similar slump retention behavior as Com. Ex. 1.2. At a lower w/c (0.30), the polycondensation products from Ex. 1.1 and Ex. 1.4 showed slightly better slump flowability than Com. Ex. 1.2.

Through the process of the present invention, polycondensation product is obtained within a substantially reduced reaction period, which means the efficiency of polycondensation is improved substantially. The product has a comparable or even better performance compared with the polymer prepared using formalin alone or using paraformaldehyde. In addition, compared with the process using sulfonic acid and paraformaldehyde, the cost of the process of the present invention will be reduced significantly.

The invention claimed is:
1. A process for producing an oxyalkylene containing polycondensation product by polycondensing monomers including (A) an aromatic or heteroaromatic compound containing a polyoxyalkylene chain, which is represented by formula (I),

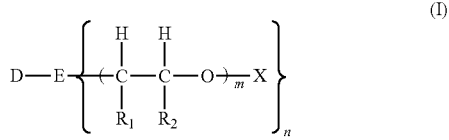

wherein

D is an unsubstituted or substituted aromatic or heteroaromatic group having from 5 to 10 ring members, optionally phenyl or naphthyl of which each is optionally substituted by one or more substituents selected from the group consisting of OH, $-OR^3$, $-NH_2$, $-NHR^3$, $C_1$-$C_{10}$-alkyl, $-SO_3H$, $-COOH$, $-PO_3H_2$, and $-OPO_3H_2$, where the $C_1$-$C_{10}$-alkyl are optionally substituted by phenyl or 4-hydroxyphenyl, $R^3$ is a $C_1$-$C_{10}$-alkyl;

$R_1$ is a group selected from H, $C_3$-$C_8$-cycloalkyl, $C_6$-$C_{10}$-aryl and 5 to 10 membered heteroaryl;

$R_2$ is a group selected from H, $C_3$-$C_8$-cycloalkyl, $C_6$-$C_{10}$-aryl and 5 to 10 membered heteroaryl;

X is a group selected from H, $C_1$-$C_{10}$-alkyl, $C_3$-$C_8$-cycloalkyl, $C_6$-$C_{10}$-aryl, 5 to 10 membered heteroaryl and $C_1$-$C_{10}$-alkyl carbonyl;

E is —O—, —NH—, or —N—;

n is 1, when E is —O— or —NH—; or n is 2, when E is —N—; and m is an integer from 1 to 300; and (B) an aromatic or heteroaromatic compound which is different from monomer (A) and is represented by formula (II),

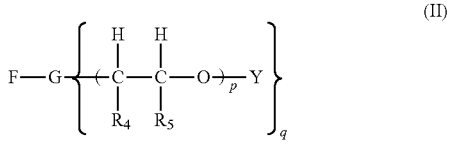

F is an unsubstituted or substituted aromatic or heteroaromatic group having from 5 to 10 ring members, optionally phenyl or naphthyl of which each is optionally substituted by one or more substituents selected from the group consisting of OH, $-OR^3$, $-NH_2$, $-NHR^3$, $-NR^3_2$, $C_1$-$C_{10}$-alkyl, $-SO_3H$, $-COOH$, $-PO_3H_2$ and $-OPO_3H_2$, where the $C_1$-$C_{10}$-alkyl are optionally substituted by phenyl or 4-hydroxyphenyl, $R^3$ is a $C_1$-$C_4$-alkyl;

$R_4$ is a group selected from H, $C_1$-$C_{10}$-alkyl, $C_3$-$C_8$-cycloalkyl, $C_6$-$C_{10}$-aryl and 5 to 10 membered heteroaryl;

$R_5$ is a group selected from H, $C_1$-$C_{10}$-alkyl, $C_3$-$C_8$-cycloalkyl, $C_6$-$C_{10}$-aryl and 5 to 10 membered heteroaryl;

Y is a group selected from H, $C_1$-$C_{10}$-alkyl, —COOH, $C_1$-$C_4$-alkyl-COOH, —SO$_3$H, $C_1$-$C_4$-alkyl-SO$_3$H, —PO$_3$H$_2$ and $C_1$-$C_4$-alkyl-PO$_3$H$_2$;

G is —O—, —NH— or —N—;

q is 1, when G is —O— or —NH—; or q is 2, when G is —N—; and p is an integer from 0 to 300; and (C) an aldehyde, in the presence of a protonation catalyst, wherein the aldehyde is provided by a fast-releasing aldehyde source and a slow-releasing aldehyde source, wherein the molar ratio of the aldehyde from the fast-releasing aldehyde source and that from the slow-releasing aldehyde source is in the range of 5:1 to 1:1

2. The process according to claim 1, wherein the fast-releasing aldehyde source comprises one or more compounds capable of releasing the aldehyde physically, optionally the fast-releasing aldehyde source being an aldehyde solution in an inert solvent.

3. The process according to claim 1, wherein the slow-releasing aldehyde source comprises one or more compounds capable of gradually releasing the aldehyde chemically.

4. The process according to claim 1, wherein the fast-releasing aldehyde source is formalin and the slow-releasing aldehyde source is paraformaldehyde.

5. The process according to claim 1, wherein the catalyst is strong inorganic acids, optionally 95-98% concentrated sulfuric acid.

6. The process according to claim 1, wherein D in formula (I) is selected from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and 4-methoxynaphthyl.

7. The process according to claim 1, wherein the monomer (A) is an adduct of 1 mol phenol, cresol, catechol, resorcinol, nonylphenol, methoxyphenol, naphthol, methylnaphthol, butylnaphthol, bisphenol A, aniline, methylaniline, hydroxyaniline, methoxyaniline and/or salicylic acid with 1 to 300 mol of an alkylene oxide.

8. The process according to claim 1, wherein F in formula (II) is selected from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and 4-methoxynaphthyl.

9. The process according to claim 1, wherein the monomer (B) is selected from the group consisting of phenol, phenoxyacetic acid, phenoxyethanol, phenoxyethanol phosphates, phenoxydiglycol, phenoxy(poly)ethyleneglycol phosphates, phenoxydiglycol phosphate, methoxyphenol, resorcinol, cresol, bisphenol A, nonylphenol, aniline, methylaniline, N-phenyldiethanolamine, N,N-di(carboxyethyl) aniline, N,N-di(carboxymethyl) aniline, N-phenyldiethanolamine diphosphate, phenolsulphonic acid and anthranilic acid.

10. The process according to claim 1, wherein the molar ratio of monomers (C):(A)+(B) is in the range of 100:1 to 1:10.

11. The process according to claim 1, wherein the molar ratio of monomers (A):(B) is in the range of 10:1 to 1:10 when monomer (B) is used.

12. The process according to claim 1, wherein the polycondensation is carried out at a temperature in the range of 20 to 140° C., and at a pressure in the range of $1 \times 10^5$ Pa to $10 \times 10^5$ Pa.

13. The process according to claim 1, wherein the aldehyde is selected from the group consisting of formaldehyde, acetaldehyde, benzaldehyde, benzaldehydesulfonic acid and benzaldehydedisulfonic acid.

14. The process according to claim 1, wherein the slow-releasing aldehyde source comprises paraformaldehyde, tetraacetaldehyde or acetals.

15. The process according to claim 1, wherein the molar ratio of the aldehyde from the fast-releasing aldehyde source and that from the slow-releasing aldehyde source is in the range of 2.5:1 to 2:1.

16. The process according to claim 1, wherein the molar ratio of monomers (C):(A)+(B) is in the range of 10:1 to 1:1.

17. The process according to claim 1, wherein the polycondensation is carried out at a temperature in the range of 60 to 140° C., and at atmospheric pressure.

* * * * *

UNITED STATES PATENT AND TRADEMARK OFFICE
CERTIFICATE OF CORRECTION

PATENT NO. : 9,018,337 B2  
APPLICATION NO. : 13/980479  
DATED : April 28, 2015  
INVENTOR(S) : Chen et al.

Page 1 of 1

It is certified that error appears in the above-identified patent and that said Letters Patent is hereby corrected as shown below:

In the Claims

In claim 1, column 15, the description of substituent D is incorrect. The description of D should read at column 15, lines 10-18, "D is an unsubstituted or substituted aromatic or heteroaromatic group having from 5 to 10 ring members, optionally phenyl or naphthyl of which each is optionally substituted by one or more substituents selected from the group consisting of OH, -OR$^3$, -NH$_2$, -NHR$^3$, -NR$^3{}_2$, C$_1$-C$_{10}$-alkyl, -SO$_3$H, -COOH, -PO$_3$H$_2$, and -OPO$_3$H$_2$, where the C$_1$-C$_{10}$-alkyl are optionally substituted by phenyl or 4-hydroxyphenyl, R$^3$ is a C$_1$-C$_4$-alkyl;"

In claim 1, column 15, the description of substituent R$_1$ is incorrect. The description of R$_1$ should read at column 15, lines 19-20, "R$_1$ is a group selected from H, C$_1$-C$_{10}$-alkyl, C$_3$-C$_8$-cycloalkyl, C$_6$-C$_{10}$-aryl and 5 to 10 membered heteroaryl;"

In claim 1, column 15, the description of substituent R$_2$ is incorrect. The description of R$_2$ should read at column 15, lines 21-22, "R$_2$ is a group selected from H, C$_1$-C$_{10}$-alkyl, C$_3$-C$_8$-cycloalkyl, C$_6$-C$_{10}$-aryl and 5 to 10 membered heteroaryl;"

Signed and Sealed this  
Eighteenth Day of August, 2015

Michelle K. Lee  
*Director of the United States Patent and Trademark Office*